Jan. 28, 1947  J. A. JOHNSON  2,414,814
BEARING SUPPORT
Filed Nov. 23, 1942  2 Sheets-Sheet 2

Inventor
J. A. Johnson
by K. A. Wyman
Attorney

Patented Jan. 28, 1947

2,414,814

UNITED STATES PATENT OFFICE 2,414,814

BEARING SUPPORT

John Algot Johnson, Wauwatosa, Wis., assignor to Allis-Chalmers Manufacturing Company, Milwaukee, Wis., a corporation of Delaware Application November 23, 1942, Serial No. 466,549

8 Claims. (Cl. 308—76)

This invention relates generally to bearing structures and more particularly to the manner of and means for supporting, lubricating and cooling bearing structures subjected to high operating temperatures.

The invention is particularly applicable, although in no manner limited, to the bearing supporting the exhaust end of the rotor in a compact gas or other high temperature elastic fluid turbine, since in such machines the bearing and its supporting structure are usually surrounded and/or contacted by high temperature surfaces and/or fluids and as a result such bearings frequently fail due to insufficient lubrication caused by a break-down of the lubricant under the prevailing high temperatures and due to the misalinement of the bearing produced by the relative expansion, excessive stressing and deformation of the supports therefor.

The primary object of this invention is to provide an improved bearing support which will entirely eliminate overheating of the bearing and the means supporting same, thereby avoiding the aforementioned causes of bearing failure.

In accordance with this invention, the hereinbefore stated object may be accomplished in whole or in part by a construction embodying one or more of the following features: (1) a rotor, (2) a bearing rotatably supporting said rotor, (3) means defining a cooling fluid space interposed between and shielding said bearing from the adjacent blade carrying portion of the rotor, (4) a shell enclosing and forming with said bearing a surrounding cooling fluid passage communicating with said space, and (5) a plurality of radially extending fluid conducting supports mounting said bearing, said cooling fluid space defining means and said shell, said supports embodying therein an inner lubricant conveying duct communicating with said bearing and outer surrounding cooling fluid conveying duct communicating with said space.

The invention accordingly consists of the various features of construction, combinations of elements and arrangements of parts as is more fully set forth in the appended claims and in the detailed description, reference being had to the accompanying drawings, in which:

Figure 1:
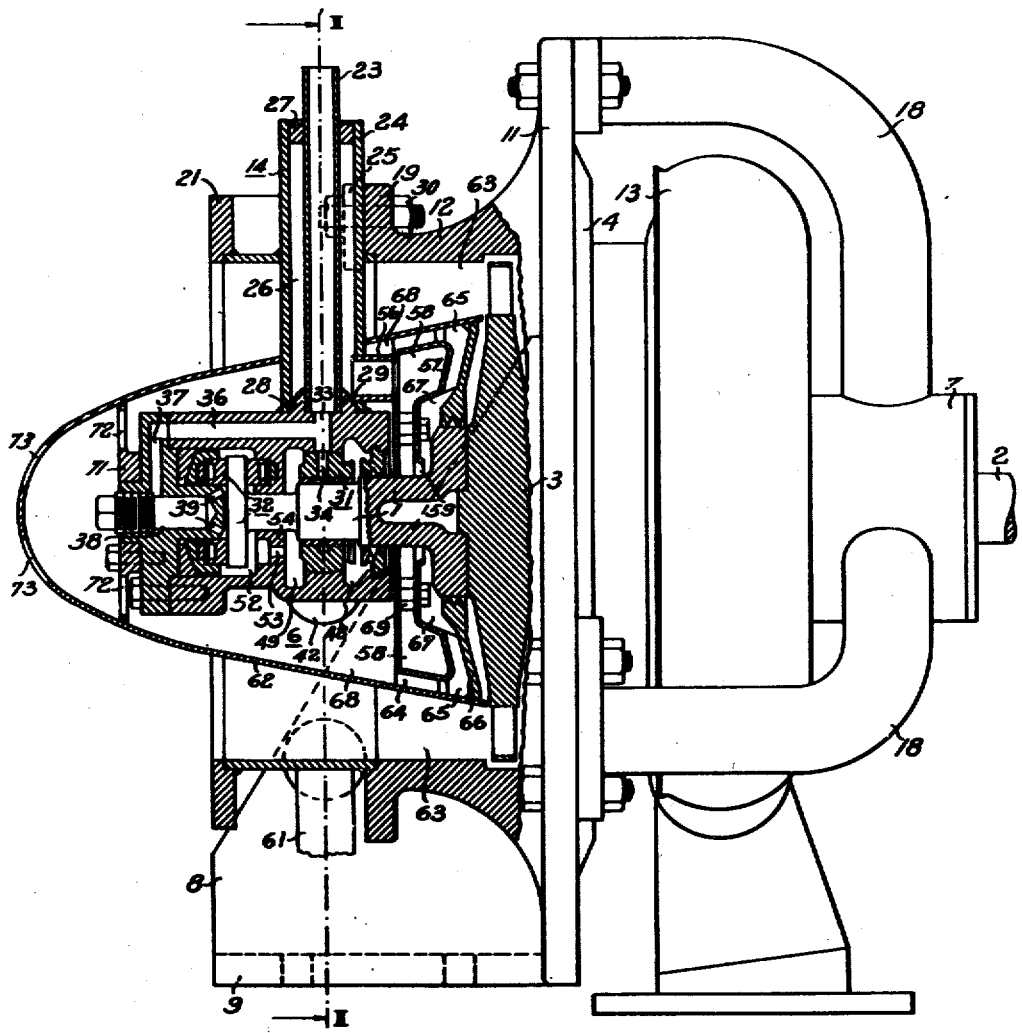
Fig. 1 is a side view, partly in longitudinal section, of a turbine embodying the invention.
Figure 2:
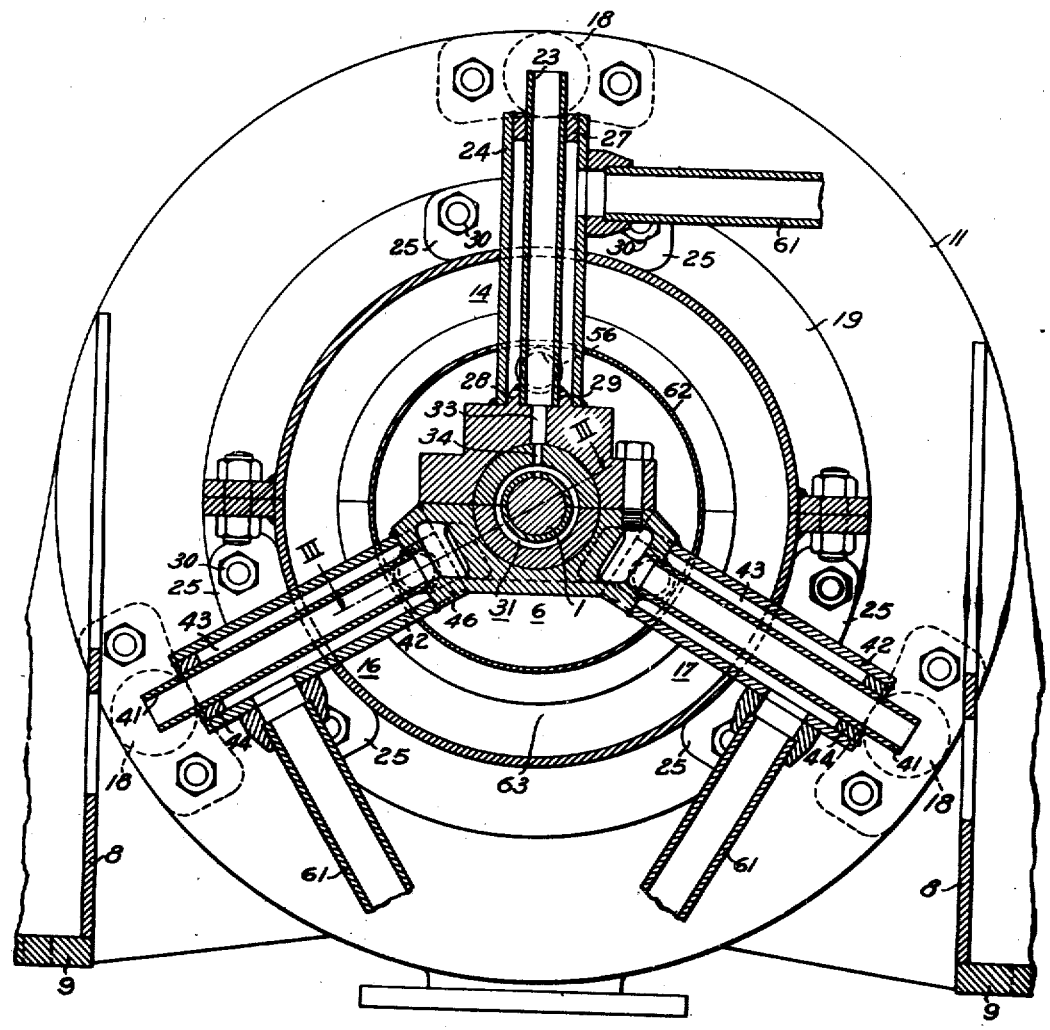
Fig. 2 is a transverse section taken on line II—II of Fig. 1.

Referring to Figs. 1 and 2 of the drawings, it is seen that a turbine structure embodying the invention may include a rotor having coaxially spaced shaft portions 1 and 2 and an intermediate blade carrying portion 3, a casing 4 surrounding the shaft and intermediate rotor portions 1 and 3, respectively, bearings 6 and 7 carried by said casing for rotatably supporting the shaft portions 1 and 2 of said rotor, and a plurality of supports for said casing comprising leg portions 8 and base portions 9 adapted to be bolted or otherwise firmly secured to a suitable foundation (not shown). The leg portions 8 of said supports are welded or otherwise secured to an intermediate flanged portion 11 of the casing 4, thereby leaving the portions of said casing on either side of said intermediate portion, that is, the exhaust portion 12 and the inlet portion 13, substantially free to expand and contract longitudinally with respect to said intermediate portion. The bearing 6 is interconnected with and supported from the exhaust portion 12 of the casing 4 by means of a plurality of radially extending tubular members designated 14, 16 and 17, and the bearing 7 is interconnected with and supported from the intermediate flanged portion 11 of the casing by means of a plurality of substantially identical radially extending members 18.

The exhaust portion 12 of casing 4 embodies an intermediate radially extending flange 19 and an outwardly extending end strengthening flange 21. The tubular support 14 for the bearing 6 extends outwardly through the casing portion 12 at a point adjacent and in abutting relation to the flange 19 and is formed by spaced inner and outer coaxial tubular fluid conductors 23 and 24 forming therebetween a cooling fluid passage 26 which is sealed at its outer end by an annular sealing and spacing plug member 27 disposed between the conductors 23 and 24; the latter being provided with oppositely extending integral lugs 25 which are united with flange 19 preferably by means of bolts 30 as shown. The inner ends of conductors 23 and 24 are welded or otherwise secured to the bearing 6 by means of a boss 28 thereon which extends within the inner end of conductor 24 and which has therein a recess 29 receiving the inner end of the conductor 23. Bearing 6 includes main and thrust portions 31 and 32, respectively, and lubricant conducting passages 33, 34, 36, 37, 38 and 39 placing said bearing portions in communication with the recess 29 and conductor 23; the latter extending outwardly beyond the end of conductor 24 for connection with a suitable source of lubricant (not shown).

Figure 3:
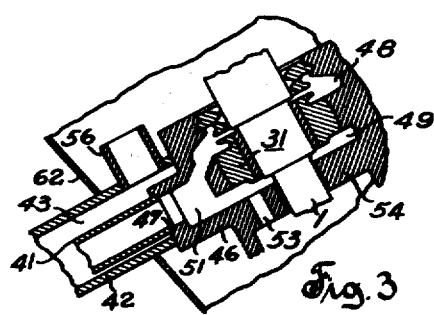
Fig. 3 is a section taken on line III—III of Fig. 2.

The support 16 for the bearing 6, which also extends outwardly through the casing portion 12 at a point adjacent and in abutting relation to the flange 19 and is secured thereto in the same manner as the member 14, is formed, particular reference being had to Fig. 3, by spaced inner and outer eccentrically disposed tubular fluid conductors 41 and 42 forming therebetween a cooling fluid passage 43 which is sealed at its outer end by a circular sealing and spacing plug member 44. The inner ends of conductors 41 and 42 may be connected with the bearing 6 in any suitable manner, but preferably by providing a stepped boss 46 thereon which is abutted by the stepped end of conductor 42 and which has in its stepped or outer portion a recess 47 receiving therein the inner end of conductor 41. Lubricant issuing from the main bearing portion 31 enters axially spaced annular lubricant receiving spaces 48 and 49 and flows outwardly therefrom through a return passage 51 which communicates with the recess 47 and the conductor 41. Lubricant issuing from the thrust bearing portion 32 enters an annular space 52 and then flows through one or more ports 53 in the separating wall 54 and into the space 49. Conductor 41 extends outwardly beyond the outer end of conductor 42 for connection with a suitable lubricant withdrawing and/or receiving means (not shown).

The construction and function of the supports 16 and 17 for the bearing 6 are identical and since the same numerals are used to designate corresponding parts, a detailed description of support 17 is deemed unnecessary for a complete understanding of the invention; it being sufficient in this connection to point out that the lubricant entering the spaces 48 and 49 from the main and thrust bearing portions passes outwardly therefrom through the two passages 51 and the conductors 41 embodied in the supports 16 and 17. The outer conductors of the supports 14, 16 and 17 each has mounted thereon adjacent its inner end a tubular connection 56 extending coaxially with respect to the shaft portion 1 of the rotor and toward the intermediate blade carrying portion 3 thereof; said connectors collectively supporting means designated 57 defining an annular coaxial cooling fluid chamber 58 which is spaced from and interposed between the blade carrying rotor portion 3 and the adjacent end of the bearing 6. The inner edge of the wall of chamber 58 adjacent the blade carrying rotor portion 3 is radially spaced from the shaft portion 1 to provide therebetween an annular cooling fluid passage 59. Connectors 56 place chamber 58 in communication with the interior of the outer conductors 24 and 42 embodied in the supports 14, 16 and 17 and each conductor 24 and 42 has its outer exposed end portion provided with a laterally extending tubular connector 61 for placing the interior of said conductors in communication with a suitable source of cooling fluid (not shown).

The bearing 6 is preferably enclosed in an annular shell 62 which is united with and carried by the outer conductors 24 and 42 embodied in supports 14, 16 and 17; said shell forming with the inner surface of the casing portion 12 an annular coaxial exhaust gas passage 63 receiving the motive fluid issuing from the last row of blades on the blade carrying rotor portion 3. The inner or rotor end of shell 62 may be stiffened by means of ribs 64 uniting same with the opposed portions of the means 57 defining the cooling fluid chamber 58. The inner end of shell 62 mounts an annular sealing and shielding disk 66 which is spaced from and interposed between the means 57 defining chamber 58 and the rotor blade carrying portion 3; said disk forming with the means 57 an annular cooling fluid passage 67 which communicates at its inner end with the passage 59 and at its outer end with the annular space 68 provided between the inner surface of shell 62 and the bearing 6. Disk 66 may be reinforced by means of ribs 65 connecting same with the adjacent wall portions of the means 57 and of shell 62. The axially spaced wall portions of means 57 may also be reinforced by spacing connections 69. If desired, the axial outer end of the bearing 6 may be connected with the adjacent end of shell 62 by any suitable mutual reinforcing means such as a disk or plate 71 having openings 72 therein for the passage of cooling fluid therethrough. The adjacent end of shell 62 is preferably provided with at least two rearwardly directed cooling fluid discharge openings 73.

Cooling fluid entering the outer ends of the conductors 24 and 42 through the connectors 61 flows radially inward toward the bearing 6 through the passages 26 and 43, which surround the inner conductors 23 and 41, thereby cooling same and preventing overheating of the lubricant passing therethrough, and then through the connectors 56, the chamber 58, the passages 59 and 67, the space 68, the openings 72 and to atmosphere through the discharge openings 73. The cooling fluid in chamber 58 and in passage 59 is in direct contact with the part of shaft portion 1 which extends between the intermediate rotor portion 3 and the bearing 6, thereby effectively cooling said shaft portion and decreasing the heat flow therethrough to the bearing 6. The disk 66 and the means 57 defining chamber 58, provide axially spaced wall surfaces and interposed cooling fluid spaces effectively shielding the rotor side of bearing 6 from the highly heated blade carrying rotor portion 3. In addition, the shell 62 shields the bearing 6 from the hot exhaust gases issuing from the blade carrying rotor portion 3 and forms with said bearing a cooling fluid space or passage 68 which surrounds the bearing, thereby enabling the cooling fluid passing therethrough to conduct away from the bearing 6 the heat trannsmitted through the shell 62. The supports 14, 16 and 17 and the connected portions of the bearing 6 are kept relatively cool by the continual flow of lubricant and cooling fluid therethrough. The parts comprising the bearing 6, by means 57 defining the cooling fluid chamber 58, the shell 62 and the disk 66 are integrally united with and carried by the members 14, 16 and 17 which are in turn preferably carried by the exhaust portion 12 of the casing 4 which provides in effect a fixed supporting means for said parts.

The illustrative construction hereinbefore described provides a compact and durable high temperature turbine structure embodying arrangements of parts and/or combinations of elements correlated to eliminate overheating of the bearing and the means supporting same, thereby avoiding excessive expansion produced stresses, misalinement and deformation of interconnected parts. The invention is of general application to bearing structures of high temperature rotary machines, and although the invention has been illustrated and described as applied to the bearing at the exhaust end of an elastic fluid turbine, it should be understood that the invention may be applied to one or more of the bearings supporting any rotary machine, that means other than a part of the machine casing may be employed as the supporting fixed means, and that it is not desired to limit the invention to the exact details of construction herein shown and described, as various modifications within the scope of the appended claims may occur to persons skilled in the art.

It is claimed and desired to secure by Letters Patent:

1. In a machine having a rotor including a main portion and a shaft portion of reduced diameter, means operatively supporting said rotor comprising a bearing for said shaft portion, fixed elements spaced from said bearing, a plurality of rigid hollow fluid conducting members extending radially outward from said bearing and supportingly mounting same on said fixed elements, and an annular shield comprising a wall structure carried by said members in interposed spaced relation between the main portion of said rotor and the adjacent end of said bearing, said wall structure including outer parts providing a fluid confining passage having an outer portion communicating with said hollow members and including an inner part spacedly surrounding said shaft portion and forming therewith an axially directed duct placing the inner portion of said fluid confining passage in direct communication with the inner part of the annular space between said structure and the main portion of said rotor.

2. In a machine having a rotor including a main portion and a shaft portion of reduced diameter, means operatively supporting said rotor comprising a bearing for said shaft portion, fixed elements spaced from said bearing, a plurality of rigid hollow fluid conducting members extending radially outward from said bearing and supportingly mounting same on said fixed elements, an annular shield structure carried by said members in interposed spaced relation between the main portion of said rotor and the adjacent end of said bearing, said shield structure providing a passage communicating with said members for conducting cooling fluid issuing therefrom inward to and along said shaft portion to the inner part of the annular space between said structure and the main portion of said rotor, and a shell carried by said members in surrounding passage forming relation with respect to said bearing and with respect to said shield structure.

3. In a machine having a rotor including a main portion and a shaft portion of reduced diameter, means operatively supporting said rotor comprising a bearing for said shaft portion, fixed elements spaced from said bearing, a plurality of rigid hollow fluid conducting members extending radially outward from said bearing and supportingly mounting same on said fixed elements, an annular shield structure carried by said members in interposed spaced relation between the main portion of said rotor and the adjacent end of said bearing, said shield structure providing a passage communicating with said members for conducting cooling fluid issuing therefrom inward to and along said shaft portion to the inner part of the annular space between said structure and the main portion of said rotor, and a shell carried by said members in surrounding passage forming relation with respect to said bearing and with respect to said shield structure, said shell including an annular end wall sealingly surrounding said shaft portion in spaced opposed relation with respect to said shield structure and with respect to the main portion of said rotor.

4. In a machine having a rotor including a main portion and a shaft portion of reduced diameter, means operatively supporting said rotor comprising a bearing for said shaft portion, fixed elements spaced from said bearing, a plurality of rigid hollow fluid conducting members extending radially outward from said bearing and supportingly mounting same on said fixed elements, and an annular hollow shield structure carried by said members in interposed spaced relation between the main portion of said rotor and the adjacent end of said bearing, said shield structure communicating with said hollow members and having an inner discharge opening for directing cooling fluid along said shaft portion and into the annular space between said structure and the main portion of said rotor.

5. In a machine having a rotor including a main portion, a shaft portion of reduced diameter and a casing surrounding said rotor, means operatively supporting said rotor comprising a bearing for said shaft portion, a plurality of rigid hollow fluid conducting members extending radially outward from said bearing and supportingly mounting same on the adjacent end portion of said casing, an annular shield structure carried by said members in interposed spaced relation between the main portion of said rotor and the adjacent end of said bearing, said shield structure providing a passage communicating with said members for conducting cooling fluid issuing therefrom inward to and along said shaft portion to the inner part of the annular space between said structure and the main portion of said rotor, and a shell carried by said members in surrounding passage-forming relation with respect to said bearing and with respect to said shield structure.

6. In a machine having a rotor including a main portion, a shaft portion of reduced diameter and a casing surrounding said rotor, means operatively supporting said rotor comprising a bearing for said shaft portion, a plurality of rigid hollow fluid conducting members extending radially outward from said bearing and supportingly mounting same on the adjacent end portion of said casing, an annular shield structure carried by said members in interposed spaced relation between the main portion of said rotor and the adjacent end of said bearing, said shield structure providing a passage communicating with said members for conducting cooling fluid issuing therefrom inward to and along said shaft portion to the inner part of the annular space between said structure and the main portion of said rotor, and a shell carried by said members in surrounding passage-forming relation with respect to said bearing and with respect to said shield structure, said shell including an annular end wall sealingly surrounding said shaft portion in spaced opposed relation with respect to said shield structure and with respect to the main portion of said rotor.

7. In a machine having a rotor including a main portion and a shaft portion of reduced diameter, means operatively supporting said rotor comprising a bearing for said shaft portion, fixed elements spaced from said bearing, a plurality of rigid hollow fluid conducting members extending radially outward from said bearing and supportingly mounting same on said fixed elements, said members including internal lubricant conveying ducts communicating with the interior of said bearing, and an annular shield carried by intermediate portions of said members and disposed in interposed spaced relation between the main portion of said rotor and the adjacent end of said bearing, and comprising a wall structure providing a fluid confining passage having an outer portion communicating with said hollow members, said wall structure including an inner part surrounding said shaft portion and providing an axially directed duct placing the inner portion of said fluid confining passage in direct communication with the inner part of the annular space between said structure and the main portion of said rotor.

8. In a machine having a rotor including a main portion and a shaft portion of reduced diameter, means operatively supporting said rotor comprising a bearing for said shaft portion, fixed elements spaced from said bearing, a plurality of rigid hollow fluid conducting members extending radially outward from said bearing and supportingly mounting same on said fixed elements, and an annular shield comprising a wall structure carried by said members in interposed spaced relation between the main portion of said rotor and the adjacent end of said bearing, said wall structure including outer parts providing a fluid confining passage having an outer portion communicating with said hollow members and including an inner part providing an axially directed duct extending along and parallel to said shaft portion and placing the inner portion of said fluid confining passage in direct communication with the inner part of the annular space between said structure and the main portion of said rotor.

JOHN ALGOT JOHNSON.